(12) United States Patent
Morin et al.

(10) Patent No.: US 11,560,849 B2
(45) Date of Patent: *Jan. 24, 2023

(54) LOW NOISE TURBINE FOR GEARED GAS TURBINE ENGINE

(71) Applicants: RAYTHEON TECHNOLOGIES CORPORATION, Farmington, CT (US); MTU Aero Engines GmbH, Munich (DE)

(72) Inventors: Bruce L. Morin, Springfield, MA (US); David A. Topol, West Hartford, CT (US); Detlef Korte, Karlsfeld (DE)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,814

(22) Filed: Oct. 18, 2021

(65) Prior Publication Data

US 2022/0220899 A1 Jul. 14, 2022

Related U.S. Application Data

(63) Continuation of application No. 16/833,782, filed on Mar. 30, 2020, now Pat. No. 11,168,614, which is a (Continued)

(51) Int. Cl.
*F02C 7/24* (2006.01)
*F02K 3/06* (2006.01)
(Continued)

(52) U.S. Cl.
CPC ............. *F02C 7/24* (2013.01); *F01D 5/02* (2013.01); *F01D 5/12* (2013.01); *F01D 5/16* (2013.01);
(Continued)

(58) Field of Classification Search
CPC .......... F02C 7/24; F02K 3/06; F05D 2210/31; F05D 2240/307
See application file for complete search history.

(56) References Cited

U.S. PATENT DOCUMENTS

| 1,478,551 A | 12/1923 | Castle |
| 2,258,792 A | 10/1941 | New |

(Continued)

FOREIGN PATENT DOCUMENTS

| CN | 1453466 A | 11/2003 |
| CN | 1952373 A | 4/2007 |

(Continued)

OTHER PUBLICATIONS

2003 NASA seal/secondary air system workshop. (2003). NASA/CP-2004-212963/VOL1. Sep. 1, 2004. pp. 1-408.

(Continued)

*Primary Examiner* — Ngoc T Nguyen
(74) *Attorney, Agent, or Firm* — Carlson, Gaskey & Olds, P.C.

(57) ABSTRACT

A gas turbine engine according to an exemplary aspect of the present disclosure includes, among other things, a propulsor section including a propulsor, a turbine section including a first turbine and a second turbine, a compressor section driven by the turbine section, the compressor section including a first compressor and a second compressor, and a geared architecture driven by the first turbine. The propulsor is driven by the first turbine via the geared architecture. At least one stage of the turbine section includes an array of rotatable blades and an array of vanes. A ratio of the number of vanes to the number blades is greater than or equal to 1.55. A mechanical tip rotational Mach number of the blades is configured to be greater than or equal to 0.5 at an approach speed.

30 Claims, 1 Drawing Sheet

Related U.S. Application Data continuation of application No. 13/970,670, filed on Aug. 20, 2013, now Pat. No. 10,605,172.

(60) Provisional application No. 61/781,170, filed on Mar. 14, 2013.

(51) Int. Cl.
| | |
|---|---|
| *F01D 5/02* | (2006.01) |
| *F01D 5/12* | (2006.01) |
| *F01D 9/04* | (2006.01) |
| *F01D 15/12* | (2006.01) |
| *F01D 17/10* | (2006.01) |
| *F01D 5/16* | (2006.01) |
| *F01D 25/04* | (2006.01) |
| *F02C 3/107* | (2006.01) |
| *F02C 7/36* | (2006.01) |

(52) U.S. Cl.
CPC ............ *F01D 9/041* (2013.01); *F01D 15/12* (2013.01); *F01D 17/105* (2013.01); *F01D 25/04* (2013.01); *F02C 3/107* (2013.01); *F02C 7/36* (2013.01); *F02K 3/06* (2013.01); *F05D 2200/36* (2013.01); *F05D 2210/31* (2013.01); *F05D 2220/32* (2013.01); *F05D 2220/327* (2013.01); *F05D 2240/301* (2013.01); *F05D 2240/307* (2013.01); *F05D 2260/40311* (2013.01); *F05D 2260/96* (2013.01); *Y02T 50/60* (2013.01)

(56) References Cited

U.S. PATENT DOCUMENTS

| | | | |
|---|---|---|---|
| 2,850,226 A | 9/1958 | Lundquist | |
| 2,936,655 A | 5/1960 | Peterson et al. | |
| 2,957,655 A | 10/1960 | Knapp et al. | |
| 3,021,731 A | 2/1962 | Stoeckicht | |
| 3,194,487 A | 7/1965 | Tyler et al. | |
| 3,270,953 A | 9/1966 | Jan et al. | |
| 3,287,906 A | 11/1966 | McCormick | |
| 3,352,178 A | 11/1967 | Lindgren et al. | |
| 3,373,928 A | 3/1968 | Erwin et al. | |
| 3,412,560 A | 11/1968 | Gaubatz | |
| 3,618,699 A | 11/1971 | Evans et al. | |
| 3,659,422 A | 5/1972 | Hope | |
| 3,664,612 A | 5/1972 | Skidmore et al. | |
| 3,747,343 A | 7/1973 | Rosen | |
| 3,754,484 A | 8/1973 | Roberts | |
| 3,765,623 A | 10/1973 | Donelson et al. | |
| 3,820,719 A | 6/1974 | Clark et al. | |
| 3,843,277 A | 10/1974 | Ehrich | |
| 3,892,358 A | 7/1975 | Gisslen | |
| 3,932,058 A | 1/1976 | Harner et al. | |
| 3,935,558 A | 1/1976 | Miller et al. | |
| 3,953,148 A | 4/1976 | Seippel et al. | |
| 3,973,865 A | 8/1976 | Mugele | |
| 3,988,889 A | 11/1976 | Chamay et al. | |
| 4,130,872 A | 12/1978 | Haloff | |
| 4,131,387 A | 12/1978 | Kazin et al. | |
| 4,220,171 A | 9/1980 | Ruehr et al. | |
| 4,240,250 A | 12/1980 | Harris | |
| 4,284,174 A | 8/1981 | Salvana et al. | |
| 4,289,360 A | 9/1981 | Zirin | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,722,357 A | 2/1988 | Wynosky | |
| 4,732,532 A | 3/1988 | Schwaller et al. | |
| 4,883,240 A | 11/1989 | Adamson et al. | |
| 4,968,216 A | 11/1990 | Anderson et al. | |
| 4,979,362 A | 12/1990 | Vershure, Jr. | |
| 5,022,824 A * | 6/1991 | Violette ................ | F04D 29/668 416/500 |
| 5,058,617 A | 10/1991 | Stockman et al. | |
| 5,102,379 A | 4/1992 | Pagluica et al. | |
| 5,141,182 A | 8/1992 | Coffinberry | |
| 5,141,400 A | 8/1992 | Murphy et al. | |
| 5,144,182 A | 9/1992 | Lemmer et al. | |
| 5,152,668 A | 10/1992 | Bulman et al. | |
| 5,169,288 A * | 12/1992 | Gliebe ................... | F02C 7/045 415/119 |
| 5,174,716 A | 12/1992 | Hora et al. | |
| 5,190,441 A | 3/1993 | Murphy et al. | |
| 5,197,855 A | 3/1993 | Magliozzi et al. | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,486,091 A | 1/1996 | Sharma | |
| 5,524,847 A | 6/1996 | Brodell et al. | |
| 5,634,767 A | 6/1997 | Dawson | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,036,438 A | 3/2000 | Imai | |
| 6,195,983 B1 | 3/2001 | Wadia et al. | |
| 6,223,616 B1 | 5/2001 | Sheridan | |
| 6,260,794 B1 | 7/2001 | Rowe | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,554,564 B1 | 4/2003 | Lord | |
| 6,607,165 B1 | 8/2003 | Manteiga et al. | |
| 6,709,492 B1 | 3/2004 | Spadaccini et al. | |
| 6,732,502 B2 | 5/2004 | Seda et al. | |
| 6,814,541 B2 | 11/2004 | Evans et al. | |
| 6,883,303 B1 | 4/2005 | Seda | |
| 7,021,042 B2 | 4/2006 | Law | |
| 7,108,485 B2 | 9/2006 | Wobben | |
| 7,219,490 B2 | 5/2007 | Dev | |
| 7,328,580 B2 | 2/2008 | Lee et al. | |
| 7,374,403 B2 | 5/2008 | Decker et al. | |
| 7,526,913 B2 | 5/2009 | Orlando et al. | |
| 7,591,754 B2 | 9/2009 | Duong et al. | |
| 7,594,388 B2 | 9/2009 | Cherry et al. | |
| 7,632,064 B2 | 12/2009 | Somanath et al. | |
| 7,662,059 B2 | 2/2010 | McCune | |
| 7,694,505 B2 | 4/2010 | Schilling | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,891,943 B2 | 2/2011 | Tsuchiya et al. | |
| 7,926,260 B2 | 4/2011 | Sheridan et al. | |
| 7,966,806 B2 | 6/2011 | Henry et al. | |
| 7,976,283 B2 | 7/2011 | Huck | |
| 7,984,607 B2 | 7/2011 | Sharma et al. | |
| 7,997,868 B1 | 8/2011 | Liang | |
| 8,205,432 B2 | 6/2012 | Sheridan | |
| 8,246,292 B1 * | 8/2012 | Morin ...................... | F02K 3/06 415/181 |
| 8,834,099 B1 | 9/2014 | Topol et al. | |
| 10,533,447 B2 | 1/2020 | Morin et al. | |
| 10,605,172 B2 | 3/2020 | Morin et al. | |
| 2002/0096598 A1 | 7/2002 | Nelson | |
| 2003/0143063 A1 | 7/2003 | Coxhead et al. | |
| 2003/0163983 A1 | 9/2003 | Seda et al. | |
| 2004/0128978 A1 | 7/2004 | McCune et al. | |
| 2005/0017876 A1 | 1/2005 | Ziarno | |
| 2006/0117756 A1 | 6/2006 | Wakeman et al. | |
| 2006/0201160 A1 | 9/2006 | Richards | |
| 2006/0228206 A1 | 10/2006 | Decker et al. | |
| 2007/0086885 A1 | 4/2007 | Appleby et al. | |
| 2008/0003096 A1 | 1/2008 | Kohli et al. | |
| 2008/0022691 A1 | 1/2008 | Kennepohl et al. | |
| 2008/0098716 A1 | 5/2008 | Orlando et al. | |
| 2008/0116009 A1 | 5/2008 | Sheridan et al. | |
| 2008/0190095 A1 | 8/2008 | Baran | |

(56) References Cited

U.S. PATENT DOCUMENTS

| | | |
|---|---|---|
| 2008/0317588 A1 | 12/2008 | Grabowski et al. |
| 2009/0000271 A1 | 1/2009 | Kupratis |
| 2009/0056343 A1 | 3/2009 | Suciu et al. |
| 2009/0191047 A1 | 7/2009 | Schlinker et al. |
| 2009/0260345 A1 | 10/2009 | Chaudhry |
| 2009/0301055 A1 | 12/2009 | Kallappa |
| 2009/0304518 A1 | 12/2009 | Kodama et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0162723 A1 | 7/2010 | Copeland et al. |
| 2010/0192595 A1 | 8/2010 | Orlando et al. |
| 2010/0212281 A1 | 8/2010 | Sheridan |
| 2010/0218483 A1 | 9/2010 | Smith |
| 2010/0281875 A1 | 11/2010 | Price et al. |
| 2010/0331139 A1 | 12/2010 | McCune |
| 2011/0056208 A1 | 3/2011 | Norris et al. |
| 2011/0159797 A1 | 6/2011 | Beltman et al. |
| 2011/0219741 A1 | 9/2011 | Ernst et al. |
| 2011/0293423 A1 | 12/2011 | Bunker et al. |
| 2012/0124964 A1 | 5/2012 | Hasel et al. |
| 2012/0198816 A1 | 8/2012 | Suciu et al. |
| 2013/0004297 A1 | 1/2013 | Sheridan |
| 2013/0025257 A1 | 1/2013 | Suciu et al. |
| 2013/0186058 A1 | 7/2013 | Sheridan et al. |
| 2013/0195610 A1 | 8/2013 | Rose et al. |
| 2013/0202403 A1 | 8/2013 | Morin et al. |
| 2013/0255219 A1 | 10/2013 | Schwarz et al. |
| 2013/0259654 A1 | 10/2013 | Kupratis et al. |
| 2013/0276424 A1 | 10/2013 | Topol et al. |
| 2013/0318998 A1 | 12/2013 | Schwarz et al. |
| 2014/0003915 A1 | 1/2014 | Topol et al. |
| 2014/0155219 A1 | 6/2014 | McCune et al. |
| 2014/0271112 A1 | 9/2014 | Morin et al. |
| 2016/0201607 A1 | 7/2016 | Gallagher et al. |
| 2019/0322392 A1 | 10/2019 | Benoit et al. |
| 2021/0062661 A1 | 3/2021 | Loos |

FOREIGN PATENT DOCUMENTS

| | | |
|---|---|---|
| DE | 102010023703 A1 | 12/2011 |
| EP | 0791383 A1 | 8/1997 |
| EP | 1142850 A1 | 10/2001 |
| EP | 2157305 A2 | 2/2010 |
| FR | 2260701 A1 | 9/1975 |
| GB | 1072145 A | 6/1967 |
| GB | 1386481 A | 3/1975 |
| GB | 1516041 A | 6/1978 |
| GB | 2041090 A | 9/1980 |
| GB | 2426792 A | 12/2006 |
| JP | H08109834 A | 4/1996 |
| JP | 2003286857 A | 10/2003 |
| JP | 2004526619 A | 9/2004 |
| JP | 2006161809 A | 6/2006 |
| JP | 2007113579 A | 5/2007 |
| JP | 2008115856 A | 5/2008 |
| JP | 2008115858 A | 5/2008 |
| JP | 2008196489 A | 8/2008 |
| JP | 2009002329 A | 1/2009 |
| JP | 2010209916 A | 9/2010 |
| WO | 0019082 A2 | 4/2000 |
| WO | 2007038674 A1 | 4/2007 |
| WO | 2013122713 A2 | 8/2013 |

OTHER PUBLICATIONS

About GasTurb. Retrieved Jun. 26, 2018 from: http://gasturb.de/about-gasturb.html.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

Aerospace Information Report. (2008). Advanced ducted propulsor in-flight thrust determination. SAE International AIR5450. Aug. 2008. p. 1-392.

Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.

AGMA Standard (1997). Design and selection of components for enclosed gear drives, lexandria, VA: American Gear Manufacturers Association, pp. 1-48.

AGMA Standard (1999). Flexible couplings—Mass elastic properties and other characteristics. Alexandria, VA: American Gear Manufacturers Association. pp. 1-46.

AGMA Standard (2006). Design manual for enclosed epicyclic gear drives. Alexandria, VA: American Gear Manufacturers Association. pp. 1-104.

Ahmad, F. and Mizramoghadam, A.V. (1999). Single v. two stage high pressure turbine design of modem aero engines. ASME. Prestend at the International Gast Turbine & Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Avco Lycoming Divison. ALF 502L Maintenance Manual. Apr. 1981. pp. 1-118.

Aviadvigatel D-110. Jane's Aero-engines, Aero-engines—Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp 1-28.

Bloomer, H.E. and Samanich, N.E. (1982). QCSEE under-the-wing enging-wing-flap aerodynamic profile characteristics NASA-TM-82890 Sep. 1, 1982. pp. 1-48.

Bloomer, H.E., Loeffler, I.J., Kreim, W.J., and Coats, J.W. (1981). Comparison of NASA and contractor resits from aeroacoustic tests of QCSEE OTW engine. NASA Technical Memorandum 81761. Apr. 1, 1981. pp. 1-30.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers,108(8), 65-67.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference, pp. 1-10.

(56) References Cited

OTHER PUBLICATIONS

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clark, B.J., McArdle, J.G., and Homyak, L. (1979). Measured and predicted noise of the Avco-Lycoming YF-102 turbofan noise. Technical Paper presented at the Fifth Aeroacoustics Conference. Seattle, WA. Mar. 12-14, 1979. pp 1-4 and Figures.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.
Crichton, D., de la Rosa Blanco, E., Law, T.R., and Hileman, J.I. (2007). Design and operation for ultra noise take-off. 45th AIAA Aerospace Sciences Meeting and Exhibit. Reno, NV. Jan. 8-11, 2007. pp. 1-18.
Culley, D., Garg, S., Hiller, S.J., Horn, W., Kumar, A., Mathews, H.K., Moustapha, H. et al. (2009). More intelligent gas turbine engines. RTO Technical Report. North Atlantic Treat Organsation (NATO). 2009. pp. 1-178.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III, W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears? Screen shot of query submitted by Vahid Dabbagh, answered by Dr. Jochan Damerau, Research General Managerat Bosch Corp., Japan. Retrieved from: https://www.researchgate.net/post/What_is_the_mesh_sliffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retrieved from https://geaviation.com/sites/default/files/datasheet-CF6-80C2.pdf.
Datasheet. CFM56-5B For the Airbus A320ceo family and CFM56-7B for the Boeing 737 family. https://www.cfmaeroengines.com/.
Datasheet. Genx™ high bypass turbofan engines. Retrieved from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades, pp. 1-18.
Davis, D.G.M. (1973). Variable-pitch fans: Progress in Britain. Flight International. Apr. 19, 1973. pp. 615-617.
Decision Denying Institution of Inter Partes Review. *General Electric Company*, Petitioner v. *United Technologies Corp*, Patent Owner. IPR2016-00857. U.S. Pat. No. 8,246,292. Entered Sep. 29, 2016. pp. 1-13.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week & Space Technology, 148(8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press, p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press, p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke J. (1992). Calculation of installation effects within performance computer programs. Advisory Group for Aerospace Research & Development Lecture Series No. 183 on Steady and Transient Performance Prediction of Gas Turbine Engines. May 1992. pp. 7.1-19.
Kurzke J. (2002). Performance modeling methodology: Efficiency definitions for cooled single and multistage turbines. Proceeding of ASME Turbo Expo, Amsterdam, The Netherlands. Jun. 3-6, 2002. pp. 1-8.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida, pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-403.
Lord, W.K., MacMartin, D.G., and Tillman, T.G. (2000). Flow control opportunities in gas turbine engines. American Institute of Aeronautics and Astronautics. pp. 1-15.

(56) References Cited

OTHER PUBLICATIONS

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley & Sons, Ltd. pp. 260-265.

Malzacher, F.J., Gier, J., and Lippl, F. (2006). Aerodesign and testing of an aeromechanically highly loaded LP turbine. Journal of Turbomachinery. vol. 128. Oct. 2006. pp. 643-649.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Manual. Student's Guide to Learning SolidWorks Software. Dassault Systemes—SolidWorks Corporation, pp. 1-156.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-179, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-179, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

McCracken, R.C. (1979). Quiet short-haul research aircraft familiarization document. NASA-TM-81149. Nov. 1, 1979. pp 1-76.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.

Meier N., "Civil Turbojet/Turbofan Specifications", 2005, retrieved from http://jet-engine.net/civtfspec.html , 8 pages.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Norton, M. and Karczub, D. (2003). Fundamentals of noise and vibration analysis for engineers. Press Syndicate of the University of Cambridge. New York: New York. p. 524.

Notice of Opposition for European Patent No. 2809881 filed Oct. 8, 2018 by Safran Aircraft Engines.

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise impact. NASA-CR-114759. Jun. 1, 1974. pp. 1-398.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petition for Inter Partes Review of U.S. Pat. No. 8,246,292, *General Electric Company*, Petitioner v, *United technologies Corporation*, Patent Owner: IPR2016-00857, filed Apr. 8, 2016, 60 pages.

Petition for Inter Partes Review of U.S. Pat. No. 8,517,668. *General Electric Company*, Petitioner, v. *United Technologies Corporation*, Patent Owner. Filed Dec. 14, 2016.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Philpot, M.G. (1992). Practical consideration in designing the engine cycle. Advisory Group for Aerospace Research & Development Lecture Series No. 183 on Steady and Transient Performance Prediction of Gas Turbine Engines. May 1992. pp. 2.1-2.24.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc?Screen=cp_nanofiber.

QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE over-the-wing final design report. (1977). NASA-CR-134848. Jun. 1, 1977. pp. 1-460.

QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

(56) References Cited

OTHER PUBLICATIONS

QCSEE preliminary analyses and design report. vol. II. (1974). NASA-CR-134839. Oct. 1, 1974. pp. 340-630.

QCSEE the aerodynamic and mechanical design of the QCSEE under-the-wing fan. (1977). NASA-CR-135009. Mar. 1, 1977. pp. 1-137.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology—Opportunities, challenges and readiness status. Porceedings CEAS. Sep. 10-13, 2007. Berlin, Germany, pp. 1-12.

Rolls-Royce M45H. Jane's Aero-engines, Aero-engines—Turbofan. Feb. 24, 2010.

Rolls-Royce, "The Jet Engine", 5th Edition, Chapter 1.4, 2005, pp. 56-87.

Rotordynamic instability problems in high-performance turbomachinery. (1986). NASA conference publication 2443. Jun. 2-4, 1986.

Roux, E. (2007). Turbofan and turbojet engines database handbook. Editions Elodie Roux. Blagnac: France. pp. 1-595.

Sabnis J.S. (2005). Emissions and noise—Next frontier for aircraft engine technologies. Presented at the AIAA/ AAAF Aircraft Noise and Emissions Reduction Symposium. Monterey, California, USA. May 24-26, 2005.

Salemme, C.T. and Murphy, G.C. (1979). Metal spar/superhybrid shell composite fan blades. Prepared for NASA. NASA-CR-159594. Aug. 1979. pp. 1-127.

Sargisson, D.F. (1985). Advanced propfan engine technology (APET) and single-rotation gearbox/pitch change mechanism. NASA Contractor Report—168113. R83AEB592 Jun. 1, 1985. pp 1-476.

Sasada, E. (2010). Kokuki engine no soon teigen gijutsu saizensen. The Journal of Aviation Environment Research. Airport Environment Improvement Foundation. Aviation Environment Research Center. Japan. Mar. 31, 2010, vol. 14, pp. 8-14.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley & Sons, Inc. pp. 722-726 and 764-771.

Shah, D.M. (1992). MoSi2 and other silicides as high temperature structural materials. Superalloys 1992. The Minerals, Metals, & Materials Society, pp. 409-422.

Groweneweg, J.F. (1994). Fan noise research at NASA. Noise-CON 94. Fort Lauderdale, FL. May 1-4, 1994. pp. 1-10.

Gunston, B. (Ed.) (2000). Jane's aero-engines, Issue seven. Coulsdon, Surrey, UK: Jane's Information Group Limited. pp. 510-512.

Guynn, M. D., Berton, J.J., Fisher, K. L., Haller, W.J., Tong, M. T. and Thurman, D.R. (2011). Refined exploration of turbofan design options for an advanced single-aisle transport. NASA/TM-2011-216883. pp. 1-27.

Guynn, M.D., et al., "Analysis of turbofan design options for an advanced single-aisle transport aircraft", American Institute of Aeronautics and Astronautics, 2009, pp. 1-13.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Haldenbrand, R. and Norgren, W.M. (1979). Airesearch QCGAT program [quiet clean general aviation turbofan engines]. NASA-CR-159758. pp. 1-199.

Hall, C.A. and Crichton, D. (2007). Engine design studies for a silent aircraft. Journal of Turbomachinery, 129, 479-487.

Halliwell, I. (1998). Preliminary engine design: A practical overview. 34th AIAA/ASME/SAE/ASEE Joint Propulsion Conference & Exhibit. Cleveland, OH. Jul. 13-15, 1998. pp. 1-7.

Han, J., Dutta, S., and Ekkad, S.V. (2000). Gas turbine heat transfer and cooling technology. New York, NY: Taylor & Francis. pp. 1-25, 129-157, and 160-249.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Hazlett, R.N. (1991). Thermal oxidation stability of aviation turbine fuels. Philadelphia, PA: ASTM. pp. 1-163.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Hemighaus, G., Boval, T., Bacha, J., Barnes, F., Franklin, M., Gibbs, L., . . . Morris, J. (2007). Aviation fuels: Techincal review. Chevron Products Company, pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp 1-13.

Hess, C. (1998). Pratt & Whitney develops geared turbofan. Flug Revue 43(7). Oct. 1998.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

(56) References Cited

OTHER PUBLICATIONS

Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C, and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for International Application No. PCT/US2013/022035, dated on Aug. 14, 2014, 7 pages.
International Preliminary Report on Patentability for PCT Application No. PCT/US2014/022512 dated on Sep. 24, 2015.
International Search Report and Written Opinion for PCT Application No. PCT/US2014/022512, dated Jul. 28, 2014, 9 pages.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
Jeng, Y.-L., Lavernia, E.J. (1994). Processing of molybdenum disilicide. J. of Mat. Sci. vol. 29. 1994. pp. 2557-2571.
Jeschke, P., Kurzke, J., Schaber, R., and Riegler, C. (2004). Preliminary gas turbine design using the multidisciplinary design system MOPEDS. Journal of Engineering for Gas Turbines and Power, vol. 126. Apr. 2004. 258-264.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Wall R.A.. (1971). Axial flow compressor performance prediction. Advisory Group for Aerospace Research & Development Lecture Series No. 83 on Modern Prediction for Turbomachine Performance. 1971. pp. 4.1-4.34.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400 30th Aerospace Sciences Meeting & Exhibit. Jan. 6-9, 1992. pp. 1-14.
Wikipedia. Gas Turbine. Retrieved Sep. 18, 2018 from: https://en.wikipedia.org/wiki/Gas_turbine.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Wilfert, G., Kriegl, B., Scheugenplug, H., Bernard, J., Ruiz, X., and Eury, S. (2005). CLEAN—validation of a high efficient low NOx core, a GTF high speed turbine and an integration of a recuperator in an environmental friendly engine concept. 41st AIAA/ASME/SAE/ASEE Joint Propulsion Conference. Tucson, AZ. Jul. 10-13, 2005. p. 1-11.
Wilfert, G., Kriegl, B., Wald, L., and Johanssen, O. (2005). CLEAN—Validation of a GTF high speed turbine and integration of heat exchanger technology in an environmental friendly engine concept. International Society on Air Breathing Engines. Feb. 2005. pp. 1-8.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.

(56) References Cited

OTHER PUBLICATIONS

Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith, S.F. (1965). A simple correlation of turbine efficiency. Journal of the Royal Aeronautical Society, vol. 69. pp. 467-470.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp 741-746.
Stewart, W.L. (1961). A study of axial-flow turbine efficiency characteristics in terms of velocity diagram parameters. ASME. Presented at the Winter Annual Meeting. New York, NY. Nov. 26-Dec. 1, 1961.
Stricker, J.M. (1998). The gas turbine engine conceptual design process: An integrated approach. Presented at the RTO AVT Symposium. Toulouse, France. May 11-15, 1998. pp. 1-9.
Stricker, J.M. and Norden, C.M. (1991). Computerized preliminary design of turbomachinery. Presented at the International Gas Turbine and Aeroengine Congress and Exposition. Orlando, FL. Jun. 3-6, 1991. pp. 1-7.
Summons to Attend Oral Proceedings for European Patent Application No. 16152992.0 dated May 14, 2021.
Summons to Attend Oral Proceedings for European Patent Application No. EP13749721.0, dated Jul. 22, 2019, 10 pages.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J Am. Ceram. Soc. 78(7). pp. 1940-1946.
Supplementary European Search Report for Application No. EP13749721.0, dated Jul. 15, 2015, 5 pages.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.

The Aircraft Gas Turbine Engine and Its Operation, United Technologies Corporation, Reprinted with Revisions, Aug. 1988, pp. 3-6 and 3-7.
The Jet Engine, Rolls-Royce plc, 5th Edition, 1996, pp. 19-26.
Third Party Observations for EP Application No. EP13749721.0 (EP2809881) dated Mar. 9, 2015.
Third Party Observations for EP Application No. EP13769027.7 (EP2776678) dated Dec. 3, 2015.
Third Party Observations for European Patent Application No. 13769027.7 (European Patent No. EP 2776678) dated Mar. 9, 2015.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Appl. No. 12/622,458, filed Nov. 20, 2009, titled Compressor with asymmetric stator and acoustic cutoff.
United Technologies Pratt & Whitney. Aeronautical Vest Pocket Handbook, 22nd Edition. Sep. 1991.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
U.S. Federal Aviation Administration. Pilot's handbook of aeronautical knowledge. FAA-H-8083-25. Chapter 9: Flight Manuals and Other Documents. 2003. pp. 1-60.
U.S. Appl. No. 13/590,328, filed Sep. 28, 2012.
U.S. Appl. No. 13/630,276, filed Aug. 21, 2012.
Vasudevan, A.K. and Petrovic, J.J. (1992). A comparative overview of molybedenum disilicide composites. Materials Science and Engineering, A155, 1992. pp. 1-17.
Decision Institution of Inter Partes Review, *General Electric Company*, Petitioner v, *United Technologies Corporation and MTU Aero Engines AG*, Patent Owner, IPR2017-00491, U.S. Pat. No. 8,517,668, Entered Jul. 6, 2017, pp. 1-4.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,246,292, Executed Apr. 5, 2016, pp. 1-54.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,869,568, Executed Mar. 28, 2016, pp. 1-87.

(56) References Cited

OTHER PUBLICATIONS

Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Dickey, T.A. and Dobak, E.R. (1972). The evolution and development status of ALF 502 turbofan engine. National Aerospace Engineering and Manufacturing Meeting San Diego, California Oct. 2-5, 1972. pp. 1-12.
Dittmar, J.H. and Woodward, R.P. (1992). An evaluation of some alternative approaches for reducing fan tone noise NASA-TM-105356 Feb. 1992. pp. 1-19.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
European Office Action for European Patent Application No. 13749721.0 dated Sep. 11, 2015.
European Office Action for European Patent Application No. 13769027.7 dated Jan. 9, 2015.
European Office Action for European Patent Application No. 13769027.7 dated Jun. 19, 2015.
European Search Report for Application No. 14775864.3 dated Sep. 29, 2016.
European Search Report for Application No. EP15151747.1, dated May 21, 2015, 7 pages.
European Search Report for Application No. EP16150538.3, dated May 25, 2016, 9 pages.
European Search Report for Application No. EP16195177.7, dated Feb. 6, 2017, 11 pages.
Extended European Search Report for Application No. 16152992.0 dated Jun. 20, 2016.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The IFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (Cat C). Chapter 79: Lubrciation System. TTFE731 Issue 2. 2010. pp. 1-24.
Cates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., ... Yang, W. (1992). Mechanical behavior and interface design of MoSi2-based alloys and composites. Materials Science and Engineering, A155, 1992. pp. 147-158.
Classman, A.J. (1992). Users manual for updated computer code for axial-flow compressor conceptual design. Prepared for NASA. NASA-CR-189171. Jul. 1992. pp. 1-24.
Classman, A.J. (Ed.) (1972). Turbine design and application, vol. one. NASA SP-290. pp. 1-99.
Cliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Cliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/VOL1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

\* cited by examiner

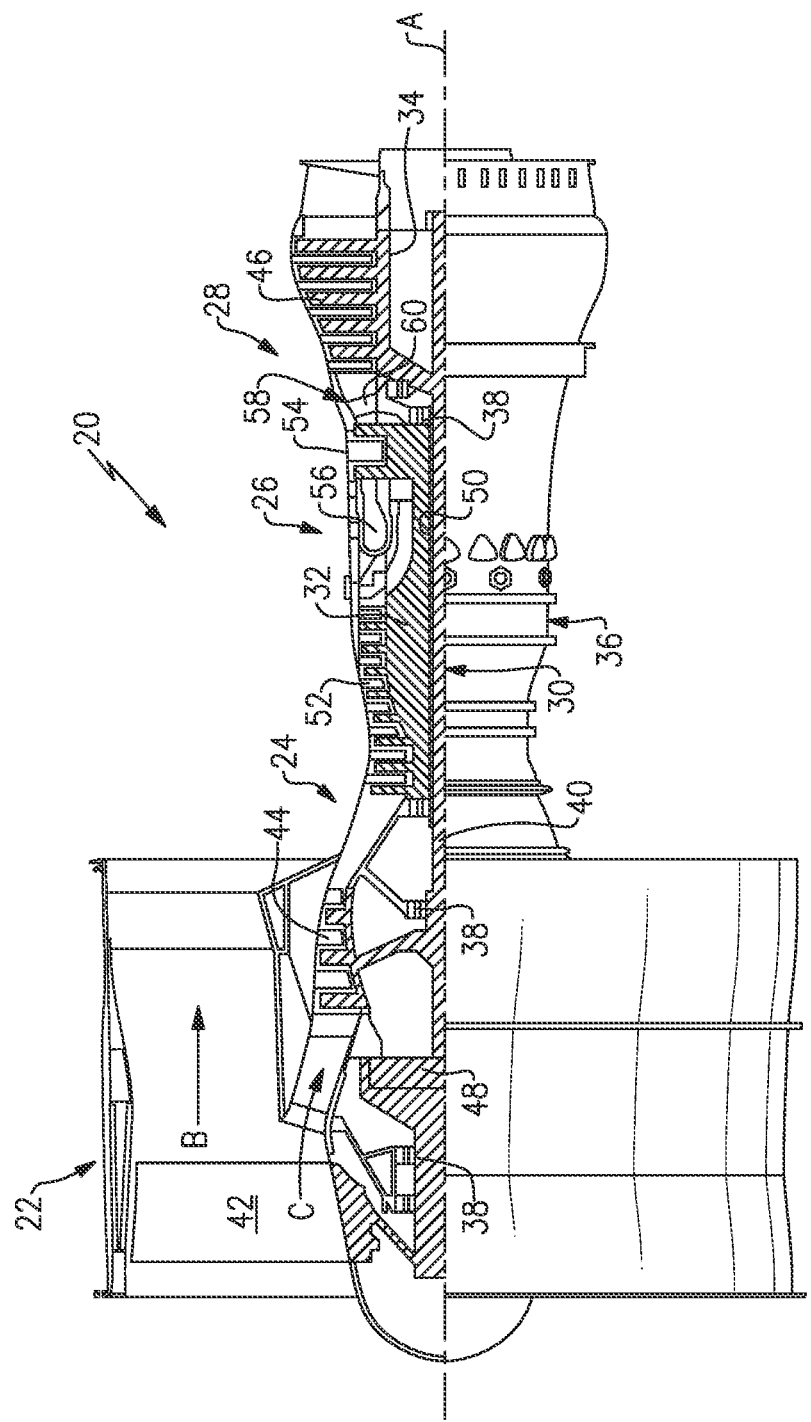

LOW NOISE TURBINE FOR GEARED GAS TURBINE ENGINE

CROSS-REFERENCE TO RELATED APPLICATIONS

This application is a continuation of U.S. patent application Ser. No. 16/833,782, filed Mar. 30, 2020, which is a continuation of U.S. patent application Ser. No. 13/970,670, filed Aug. 20, 2013, which claims priority to U.S. Provisional Application No. 61/781,170, which was filed on 14 Mar. 2013 and is incorporated herein by reference.

BACKGROUND

This disclosure relates to the design of a lower noise gas turbine engine turbine.

Gas turbine engines are known, and typically include a fan delivering air into a compressor. The air is compressed in the compressor and delivered downstream into a combustor section where it is mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades that rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades that rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

Historically, the low pressure turbine has driven both a low pressure compressor section and a fan section. More recently, a gear reduction has been provided such that the fan and low pressure compressor can be driven at distinct speeds.

With the inclusion of a gear, low pressure turbine speeds have increased. Thus, to "cutoff" these turbines, vane-to-blade ratios must be higher than for turbines in a conventional engine.

SUMMARY

A gas turbine engine according to an exemplary aspect of the present disclosure includes, among other things, a turbine section including a fan drive turbine, a compressor section driven by the turbine section, a geared architecture driven by the fan drive turbine, and a fan driven by the fan drive turbine via the geared architecture. At least one stage of the turbine section includes an array of rotatable blades and an array of vanes. A ratio of number of vanes to the number blades is greater than or equal to about 1.55. A mechanical tip rotational Mach number of the blades is configured to be greater than or equal to about 0.5 at an approach speed.

In a further non-limiting embodiment of the foregoing gas turbine engine, the vanes of the at least one stage are immediately upstream or downstream from the blades.

In a further non-limiting embodiment of any of the foregoing gas turbine engines, the gas turbine engine is rated to produce 15,000 pounds of thrust or more.

In a further non-limiting embodiment of any of the foregoing gas turbine engines, the at least one stage comprises a stage of a low pressure turbine.

In a further non-limiting embodiment of any of the foregoing gas turbine engines, the at least one stage comprises each stage of a low pressure turbine.

In a further non-limiting embodiment of any of the foregoing gas turbine engines, the gear reduction has a gear ratio of greater than about 2.3.

In a further non-limiting embodiment of any of the foregoing gas turbine engines, the fan delivers air into a bypass duct, and a portion of air into the compressor section, with a bypass ratio defined as the volume of air delivered into the bypass duct compared to the volume of air delivered into the compressor section, and the bypass ratio being greater than about six (6).

In a further non-limiting embodiment of any of the foregoing gas turbine engines, the bypass ratio is greater than about ten (10).

In a further non-limiting embodiment of any of the foregoing gas turbine engines, the turbine section is a turbine section of a three-spooled gas turbine engine.

A turbine section of a geared gas turbine engine according to an exemplary aspect of the present disclosure includes, among other things, at least one stage having a ratio of vanes to blades that is greater than or equal to about 1.55. The blades are configured to operate at a mechanical tip rotational Mach number that is greater than or equal to about 0.5 at an approach speed.

In a further non-limiting embodiment of the foregoing turbine section, the vanes of the at least one stage are immediately upstream or downstream from the blades.

In a further non-limiting embodiment of any of the foregoing turbine sections the geared gas turbine engine is rated to produce 15,000 pounds of thrust or more.

In a further non-limiting embodiment of any of the foregoing turbine sections, the at least one stage comprises a stage of a low pressure turbine.

In a further non-limiting embodiment of any of the foregoing turbine sections, the at least one stage comprises each stage of a low pressure turbine.

A method of expansion in a gas turbine according to another exemplary aspect of the present disclosure includes, among other things, providing at least one stage of a turbine section of a geared gas turbine engine, the at least one stage having a ratio of vanes to blades that is greater than or equal to about 1.55. The mechanical tip rotational Mach number is configured to be greater than or equal to about 0.5 at the approach speed.

In a further non-limiting embodiment of the foregoing method, the at least one stage comprises at least one stage of a low pressure turbine.

These and other features of this disclosure will be best understood from the following specification and drawings, the following of which is a brief description.

BRIEF DESCRIPTION OF THE DRAWINGS

FIG. 1 shows an example gas turbine engine.

DETAILED DESCRIPTION

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/(518.7° R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the gear reduction between the low speed spool 30 and the fan 42 allows an increase of speed to the low pressure turbine 46. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused by a desire to not have unduly high fan speeds.

In geared gas turbine engines, such as the engine 20, a careful design between the number of vanes and blades in the low pressure turbine 46, and the mechanical tip rotational Mach number of the low pressure turbine 46 can be selected to reduce turbine noise through the use of the mechanism referred to as "cutoff." This "cutoff" mechanism occurs when the vane-to-blade ratio is selected such that the fundamental blade passage tone is prevented from propagating to the far-field. This mechanism has been used previously in non-geared engines, which have low pressure turbines that operate at low tip Mach numbers, typically no greater than 0.5. However, "cutoff" has not been used in geared engines, such as those described herein, which have low pressure turbines that operate at high tip Mach numbers, typically greater than 0.5. On geared engines with such turbines, the "cutoff" mechanism requires a larger vane-to-blade ratio than it would on non-geared engines.

The mechanical tip rotational Mach number, $M_{tip}$, is generally defined as:

$$M_{tip} = \frac{\pi}{720c} DN$$

wherein N is a rotor rotational speed in revolutions per minute, c is the local speed of sound in feet per second and D is the local tip diameter in inches.

The mechanical tip rotational Mach number for any blade row may be calculated in this manner.

Although described with reference to the two-spool engine 20, the relationship between the number of vanes and blades in the low pressure turbine 46, and the mechanical tip rotational Mach number of the low pressure turbine 46 may be applicable to three-spool direct drive engines or three-spool engines having a gear reduction as well.

In the example engine 20, a ratio of the number of vanes to blades in a stage of the low pressure turbine is greater than or equal to $R_A$. In this example, a mechanical tip rotational Mach number of the blade of the low pressure turbine is greater than or equal to $M_A$ at approach speed. In the example engine 20, $R_A$ is about 1.55 and $M_A$ is about 0.5. This novel design will result in reduced low pressure turbine noise because at least one stage of the low pressure turbine is "cutoff" at its rotor blade passing frequency.

The stage including the vanes and blades greater than or equal to $R_A$, can be any stage of the low pressure turbine 46.

The stage may also be a stage of the high pressure turbine 54, or, if present, an intermediate pressure turbine. In a high or intermediate pressure turbine example, $R_A$ may be greater than or equal to 1.55.

It is envisioned that all of the stages in the low pressure turbine 46 (or high pressure turbine 54 or, if present, an intermediate pressure turbine) would include a ratio of vanes to blades that is greater than or equal to $R_A$. However, this disclosure may also extend to turbines wherein only one of the stages has a ratio of vanes to blades that is greater than or equal to $R_A$. This disclosure also extends to turbines wherein more than one, but less than all, of the stages has a ratio of vanes to blades that is greater than or equal to $R_A$.

The mechanical tip rotational Mach number is measured at engine operating conditions corresponding to one or more of the noise certification points defined in Part 36 of the Federal Airworthiness Regulations. More particularly, the rotational speed may be taken as an approach certification point as defined in Part 36 of the Federal Airworthiness Regulations. For purposes of this application and its claims, the term "approach speed" equates to this certification point.

The disclosed examples are most applicable to jet engines rated to produce 15,000 pounds (66,723 N) of thrust or more.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a propulsor section including a propulsor having a plurality of propulsor blades;
   a turbine section including a first turbine and a second turbine;
   a compressor section driven by the turbine section, the compressor section including a first compressor and a second compressor;
   a geared architecture driven by the first turbine;
   a first shaft that connects an input of the geared architecture to the first turbine;
   a second shaft that connects the second compressor and the second turbine, and wherein the first and second shafts are concentric and are rotatable via bearing systems about an engine axis;
   wherein the propulsor is driven by the first turbine via the geared architecture, and the second turbine drives the second compressor;
   wherein at least one stage of the turbine section includes an array of rotatable blades and an array of vanes, and the array of vanes of the at least one stage are immediately upstream or downstream from the array of blades;
   wherein a ratio of the number of vanes to the number of blades of the at least one stage is greater than or equal to 1.55;
   wherein a mechanical tip rotational Mach number of the array of blades is greater than or equal to 0.5 at an approach speed, the approach speed taken at an approach certification point as defined in Part 36 of the Federal Airworthiness Regulation; and
   wherein the gas turbine engine is rated to produce 15,000 pounds of thrust or more.

2. The gas turbine engine as recited in claim 1, wherein the geared architecture is an epicyclic gear train.

3. The gas turbine engine as recited in claim 2, wherein the first turbine includes a plurality of stages, and the at least one stage comprises at least one stage of the plurality of stages of the first turbine.

4. The gas turbine engine as recited in claim 3, wherein the first compressor includes a plurality of stages.

5. The gas turbine engine as recited in claim 4, wherein the geared architecture has a gear ratio of greater than 2.3.

6. The gas turbine engine as recited in claim 5, wherein the first turbine includes three (3) turbine rotors.

7. The gas turbine engine as recited in claim 6, wherein the second turbine includes two stages.

8. The gas turbine engine as recited in claim 7, further comprising a pressure ratio of less than 1.50 across the propulsor blade alone.

9. The gas turbine engine as recited in claim 8, wherein the first turbine drives the first compressor and an input of the geared architecture.

10. The gas turbine engine as recited in claim 9, wherein the first compressor has a greater number of stages than the second turbine.

11. The gas turbine engine as recited in claim 10, wherein the propulsor has less than twenty-six (26) propulsor blades.

12. The gas turbine engine as recited in claim 11, wherein:
the propulsor has a low corrected tip speed of less than 1150 ft/second; and
the first turbine includes an inlet, an outlet and a pressure ratio of greater than 5, the pressure ratio being pressure measured prior to the inlet as related to pressure at the outlet prior to an exhaust nozzle.

13. The gas turbine engine as recited in claim 12, wherein the geared architecture is a star gear system.

14. The gas turbine engine as recited in claim 13, wherein the first turbine includes no more than six (6) turbine rotors.

15. The gas turbine engine as recited in claim 14, wherein the at least one stage comprises only one stage of the first turbine.

16. The gas turbine engine as recited in claim 14, wherein the at least one stage comprises more than one stage of the plurality of stages of the first turbine.

17. The gas turbine engine as recited in claim 16, wherein the pressure ratio is less than 1.45 across the propulsor blade alone.

18. The gas turbine engine as recited in claim 17, wherein the propulsor has less than twenty (20) propulsor blades.

19. The gas turbine engine as recited in claim 18, wherein the at least one stage comprises less than all of the stages of the first turbine.

20. The gas turbine engine as recited in claim 18, wherein the at least one stage comprises all of the stages of the first turbine.

21. The gas turbine engine as recited in claim 20, wherein the turbine section includes a mid-turbine frame between the first turbine and the second turbine, the mid-turbine frame supports bearing systems in the turbine section, and the mid-turbine frame includes vanes in a core flow path.

22. The gas turbine engine as recited in claim 12, wherein the geared architecture is a planetary gear system.

23. The gas turbine engine as recited in claim 22, wherein the first turbine includes no more than six (6) turbine rotors.

24. The gas turbine engine as recited in claim 23, wherein the at least one stage comprises only one stage of the first turbine.

25. The gas turbine engine as recited in claim 23, wherein the at least one stage comprises more than one stage of the plurality of stages of the first turbine.

26. The gas turbine engine as recited in claim 25, wherein the pressure ratio is less than 1.45 across the propulsor blade alone.

27. The gas turbine engine as recited in claim 26, wherein the propulsor has less than twenty (20) propulsor blades.

28. The gas turbine engine as recited in claim 27, wherein the at least one stage comprises less than all of the stages of the first turbine.

29. The gas turbine engine as recited in claim 27, wherein the at least one stage comprises all of the stages of the first turbine.

30. The gas turbine engine as recited in claim 29, wherein the turbine section includes a mid-turbine frame between the first turbine and the second turbine, the mid-turbine frame supports bearing systems in the turbine section, and the mid-turbine frame includes vanes in a core flow path.

* * * * *